US012330276B2

(12) United States Patent
Koyama

(10) Patent No.: US 12,330,276 B2
(45) Date of Patent: Jun. 17, 2025

(54) EXTRACTION TOOL

(71) Applicant: Panasonic Intellectual Property Management Co., Ltd., Osaka (JP)

(72) Inventor: Tatsuya Koyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 18/076,619

(22) Filed: Dec. 7, 2022

(65) Prior Publication Data

US 2024/0033888 A1 Feb. 1, 2024

(30) Foreign Application Priority Data

Jul. 29, 2022 (JP) ................................ 2022-121869

(51) Int. Cl.
*B25B 27/00* (2006.01)
*B25B 27/14* (2006.01)

(52) U.S. Cl.
CPC .................................. *B25B 27/14* (2013.01)

(58) Field of Classification Search
CPC ....... B25B 27/00; B25B 27/02; B25B 27/023; B25B 27/0007; B23P 11/00; B23P 11/027
See application file for complete search history.

(56) References Cited

U.S. PATENT DOCUMENTS 1,616,300 A * 2/1927 Bido .................... B25B 15/007 81/438
7,814,631 B2 * 10/2010 Wallek ................... B25B 31/00 29/244
8,424,180 B2 * 4/2013 Wallek .................. B25D 17/02 81/177.85
9,943,946 B2 * 4/2018 Peters ................. B25B 23/0035
11,642,765 B2 * 5/2023 Van Essen .......... B25B 23/0064 81/429
11,648,649 B2 * 5/2023 Liu ..................... B25B 23/0035 81/177.2
11,752,606 B1 * 9/2023 Young ..................... B25B 27/10 29/278
2008/0173141 A1 * 7/2008 Wallek .................... B25B 31/00 81/177.85
2014/0084610 A1 3/2014 Nguyen

FOREIGN PATENT DOCUMENTS

| | | |
|---|---|---|
| EP | 3 779 541 | 2/2021 |
| JP | 7-22210 | 5/1995 |
| JP | 7-226284 | 8/1995 |

OTHER PUBLICATIONS

Extended European Search Report issued Jul. 17, 2023 in related European Patent Application No. 23151134.6.

* cited by examiner

*Primary Examiner* — Lee D Wilson
(74) *Attorney, Agent, or Firm* — Wenderoth, Lind & Ponack, L.L.P.

(57) ABSTRACT

An extraction tool that is configured to extract an object inside a hole includes: a grip having an end; a first member including a non-contact part provided at the end of the grip and not being able to come into contact with the object, and a contact layer provided at the end of the non-contact part and being able to come into contact with the object; and a second member surrounding at least a part of the first member. The non-contact part of the first member can slide with respect to the second member.

12 Claims, 19 Drawing Sheets

<FRONT VIEW>

<TOP VIEW>

<LEFT SIDE VIEW>

<RIGHT SIDE VIEW>

<BACK VIEW>

<BOTTOM VIEW>

<TIME T21>

<TIME T22>

<TIME T23>

EXTRACTION TOOL

BACKGROUND

1. Technical Field

The present disclosure relates to an extraction tool.

2. Description of the Related Art

Examined Japanese Utility Model Publication No. H07-22210 discloses a pinching tool that can repeatedly perform adhering and peeling off using an adhesive material.

The pinching tool is provided with a tip having a tip opening serving as an opening portion at one end of a shaft tube serving as an enclosure, and has a configuration in which a core body provided with the adhesive material at a front end portion inside the shaft tube moves back and forth by pressing of a knocking body and returning force of a spring, and at the same time, the adhesive material is in a state of being outside and a state of being inside the tip opening. In the pinching tool, when the adhesive material enters inside the tip opening, the tip opening prevents an object adhered to the adhesive material from entering the inside of the shaft tube, and the object can be peeled off and removed.

SUMMARY

The present disclosure has been made in view of the above-described conventional circumstances, and an object of the present disclosure is to provide an extraction tool that easily extracts an object inside a hole.

An extraction tool according to the present disclosure that is configured to extract an object inside a hole includes: a grip having an end; a first member including a non-contact part provided at the end of the grip and not being able to come into contact with the object, and a contact layer provided at the end of the non-contact part and being able to come into contact with the object; and a second member surrounding at least a part of the first member. The non-contact part of the first member is slidable with respect to the second member.

According to the present disclosure, the object inside the hole can be easily extracted.

DETAILED DESCRIPTION (Circumstances that have LED to the Present Disclosure)

As disclosed in Examined Japanese Utility Model Publication No. H07-22210, conventionally, a pinching tool is available, the pinching tool that includes an adhesive material housed in a shaft tube at the time of peeling off a small object or the like and being projected from the shaft tube at the time of adhering the object. When the adhesive force of the adhesive material of the pinching tool decreases due to adhesion of dust or the like, the adhesive force can be restored by removing a portion where the adhesive force has decreased.

Moreover, in an aircraft in recent years, a personal monitor that can be used such as in watching a movie, playing a game, reading, checking a flight status, or a seat monitor that can provide other types of onboard entertainment is installed in each seat, and an audio jack is provided in the seat monitor. Also in a seat without the seat monitor, the audio jack is provided on an armrest or the like of the seat. By connecting a phone plug such as an earphone or a headphone to the audio jack, a passenger can listen to sound of a movie, a game, music, or the like output from the seat monitor. However, if the phone plug is broken inside the audio jack, a case where the phone plug cannot be extracted possibly occurs.

In this case, an administrator (for example, a mechanic of the aircraft or a cabin crew) has to detach the seat monitor from each seat, then detach the audio jack from the seat monitor, disassemble the seat monitor, and extract the broken phone plug, which is troublesome. Therefore, there has been a demand for a tool that can extract the phone plug remaining broken in the audio jack without having the seat monitor detached from the seat.

However, in the case of extracting the remaining broken phone plug in the audio jack using the above-described pinching tool, because the entire surface of the adhesive material of the pinching tool is the adhesive surface, the adhesive material possibly adheres to the inside of the audio jack.

Hereinafter, an exemplary embodiment in which an extraction tool according to the present disclosure is specifically disclosed is described below in detail with reference to the drawings as appropriate. It is noted that a more detailed description than need may be omitted. For example, detailed description of well-known matters and repeated description of substantially the same configuration may be omitted. This is to avoid the unnecessary redundancy in the following description and to make the description easier to understand for those skilled in the art. Note that the appended drawings and the following descriptions are provided for those skilled in the art to fully understand the present disclosure, and are not intended to limit the subject matter set forth in the claims in any way.

Exemplary Embodiment

Figure 1:
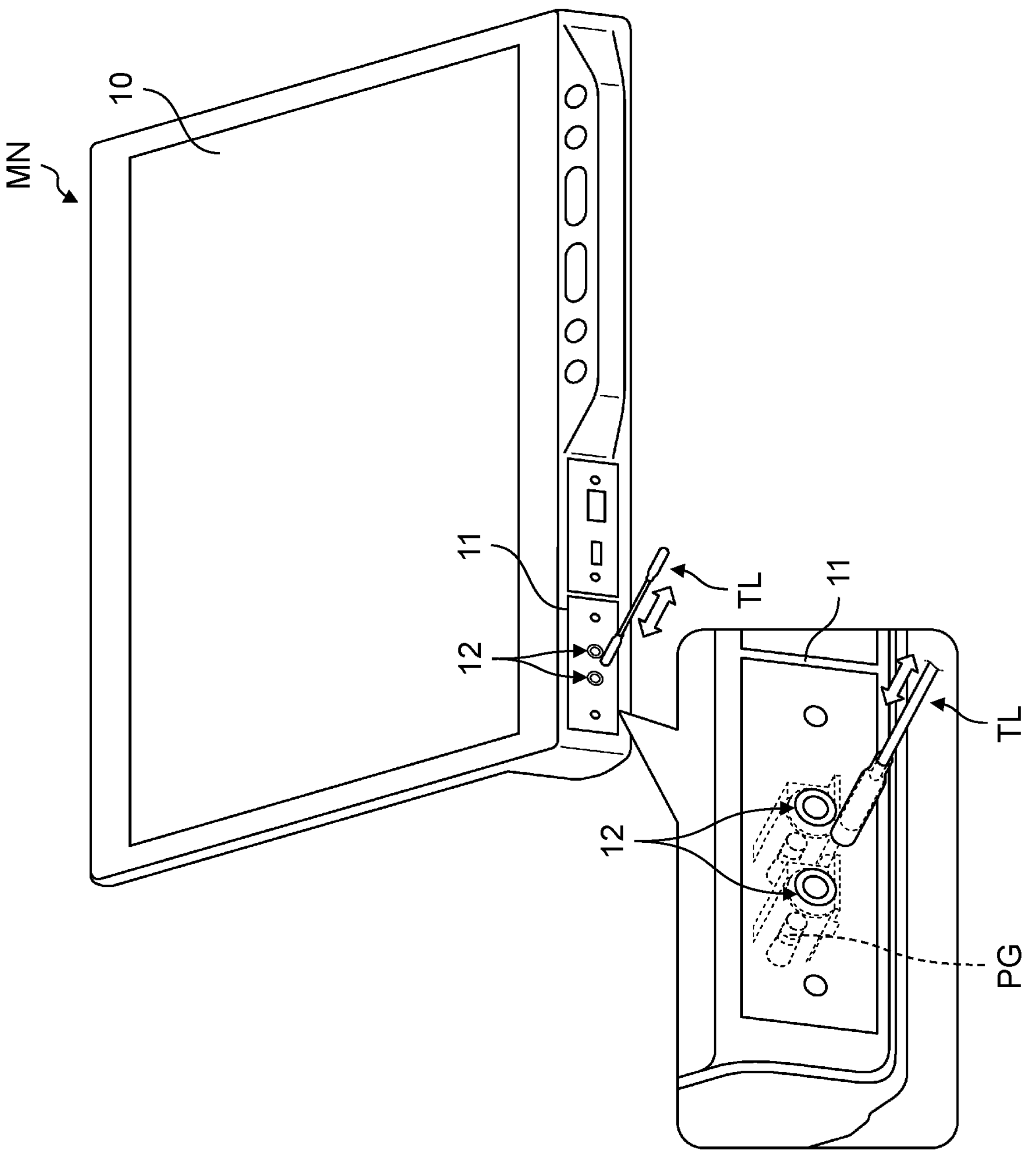
FIG. 1 is a view showing an example of a seat monitor and an extraction tool according to an exemplary embodiment.

First, seat monitor MN according to the exemplary embodiment is described. FIG. 1 is a view showing an example of seat monitor MN and extraction tool TL according to the exemplary embodiment. Note that seat monitor MN shown in FIG. 1 is an example and is not limited thereto. Further, the installation position, the installation angle, and the like of audio jack 12 provided in seat monitor MN shown in FIG. 1 are merely examples and are not limited thereto.

Seat monitor MN is installed in an aircraft, a vehicle, or the like. Seat monitor MN receives an operation by a user (such as a passenger) and realizes a function (such as movie viewing, games, reading, or notification of flight status) desired by the user. Seat monitor MN includes monitor 10 and audio connection part 11. Note that the number and positions of audio jacks 12 shown in FIG. 1 are an example and not limited thereto.

Monitor 10 is a touch panel constituted by using a display such as a liquid crystal display (LCD) or an organic electroluminescence (EL) and an input sensor that can receive the operation by the passenger. Monitor 10 displays an image (screen), a video, and the like on a display based on the operation by the passenger, and receives the operation by the user on the displayed image (screen) and video.

Audio connection part 11 includes at least one audio jack 12 (which is an example of a hole). Audio connection part 11 is used to input and output an audio signal between a processor (not illustrated) of seat monitor MN and each of the plurality of audio jacks 12.

Each of the plurality of audio jacks 12 can have a phone plug such as an earphone or a headphone to be inserted thereinto and extracted therefrom. Each of the plurality of audio jacks 12 outputs an audio signal (electric signal) based on the audio data to the phone plug PG (an example of an object), thereby realizing audio output to an earphone, a headphone, or the like.

Extraction tool TL is inserted into and extracted from audio jack 12 similarly to the insertion and extraction of the phone plug. Extraction tool TL includes a pair of adhesive parts 20 (see FIG. 3) that can be inserted into and removed from audio jack 12. In extraction tool TL, each of the pair of adhesive parts 20 has, at the tip, adhesive layer 21A or 21B (see FIG. 9). Note that extraction tool TL only needs to have at least one adhesive part 20.

Extraction tool TL is used by a user (such as a maintenance worker, a technician, or a cabin crew) who manages seat monitor MN provided with audio jack 12. Extraction tool TL is extracted from audio jack 12, in a state where adhesive layer 21A or 21B is adhered to phone plug PG remaining broken in audio jack 12, to extract phone plug PG remaining broken in audio jack 12.

Figure 2:
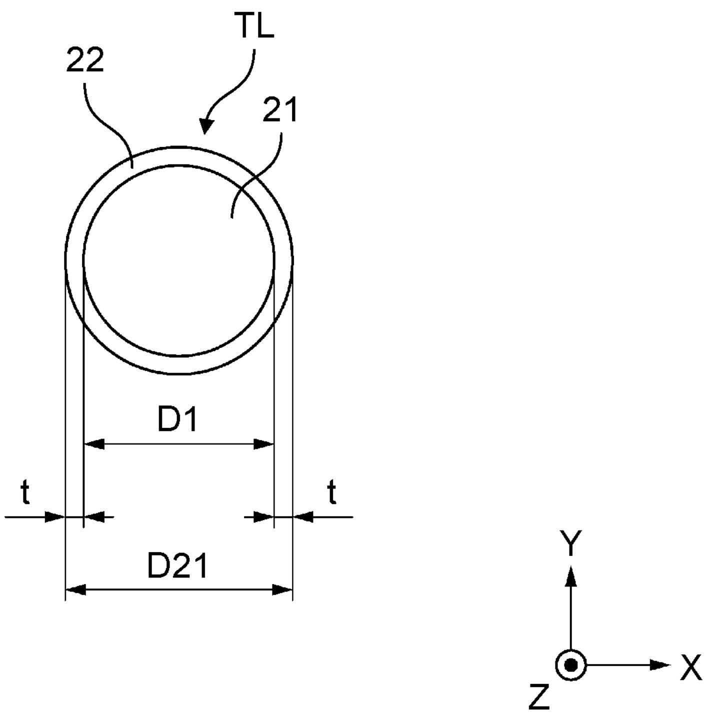
FIG. 2 is a front view of the extraction tool.
Figure 3:
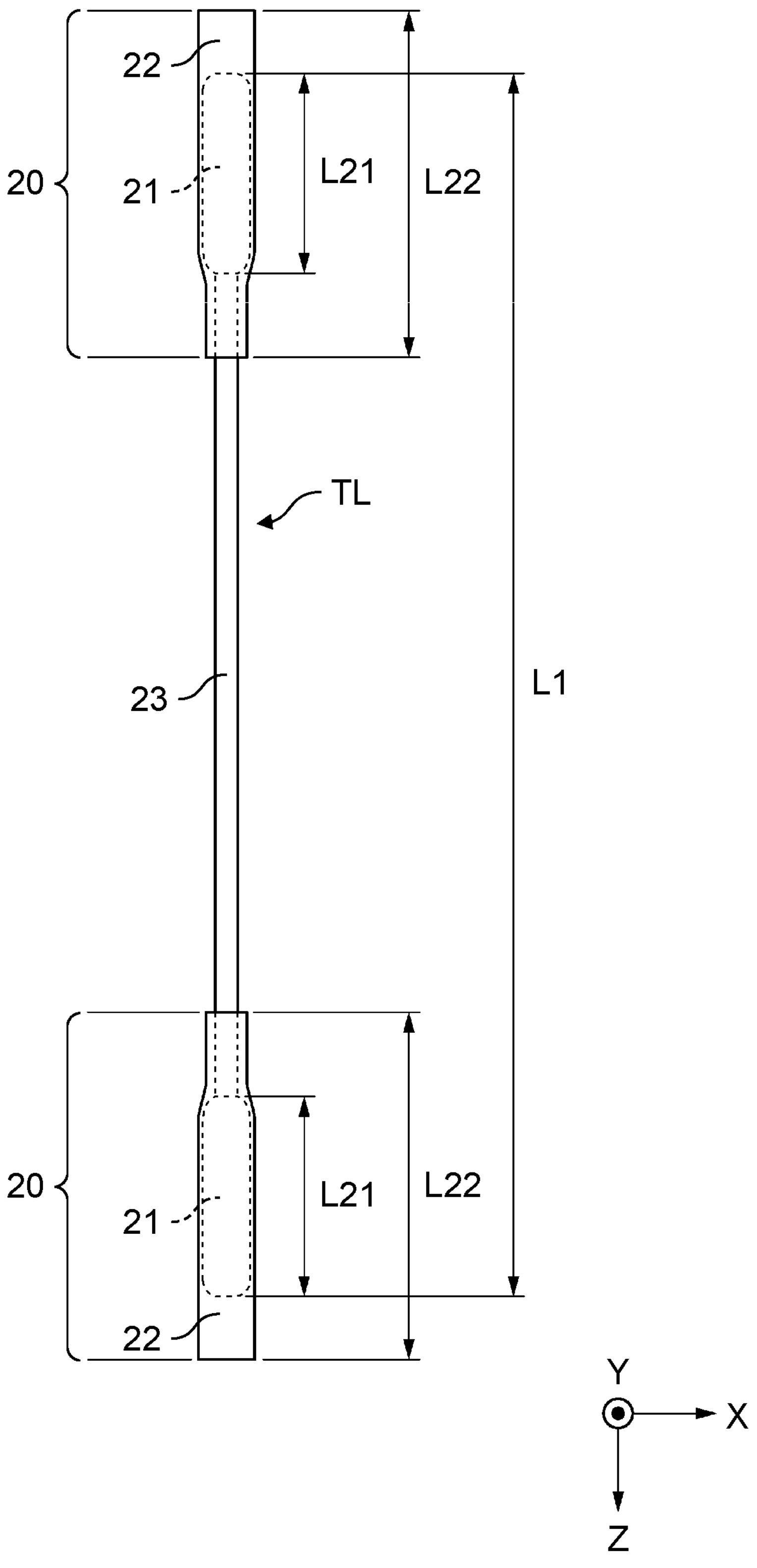
FIG. 3 is a top view of the extraction tool.
Figure 4:
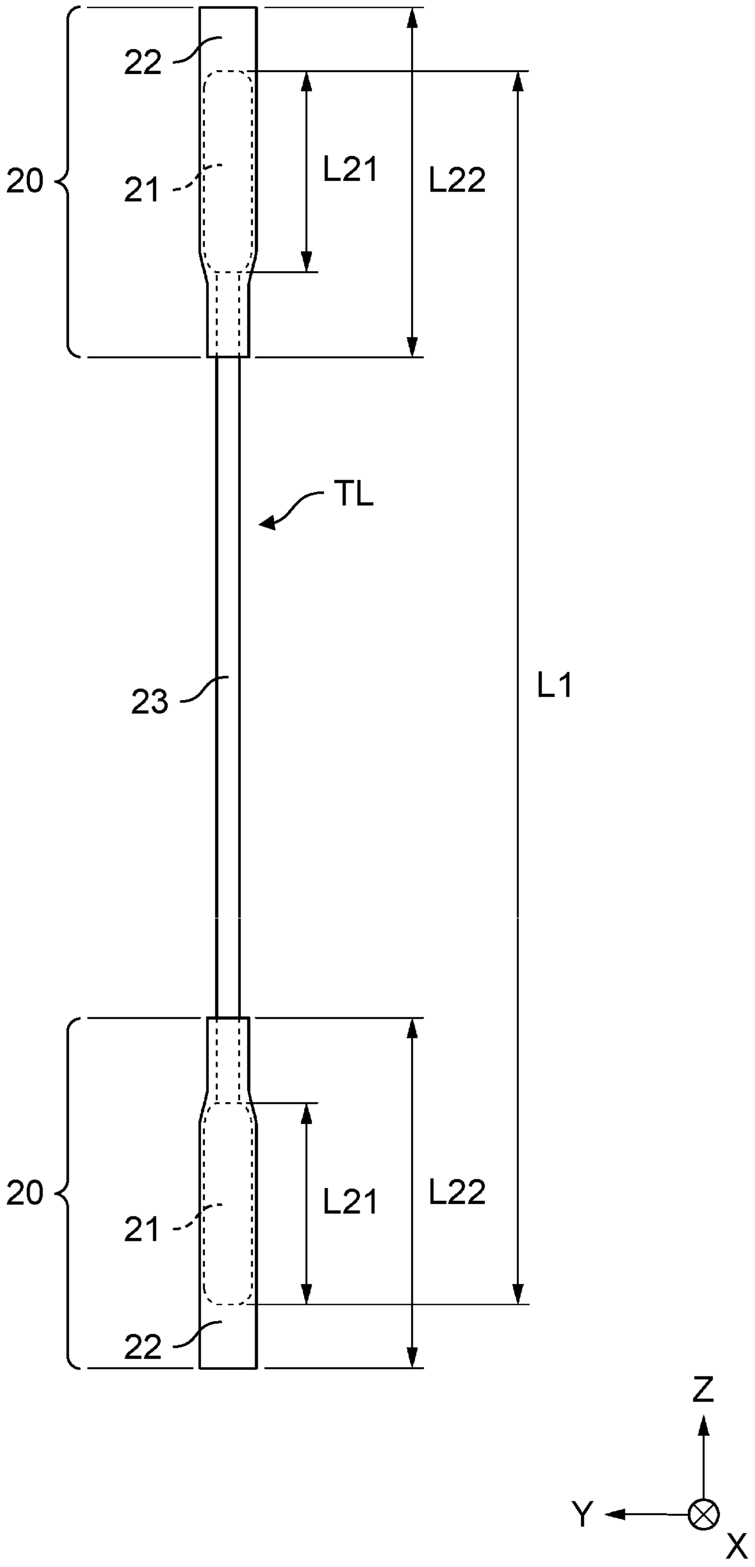
FIG. 4 is a left side view of the extraction tool.
Figure 5:
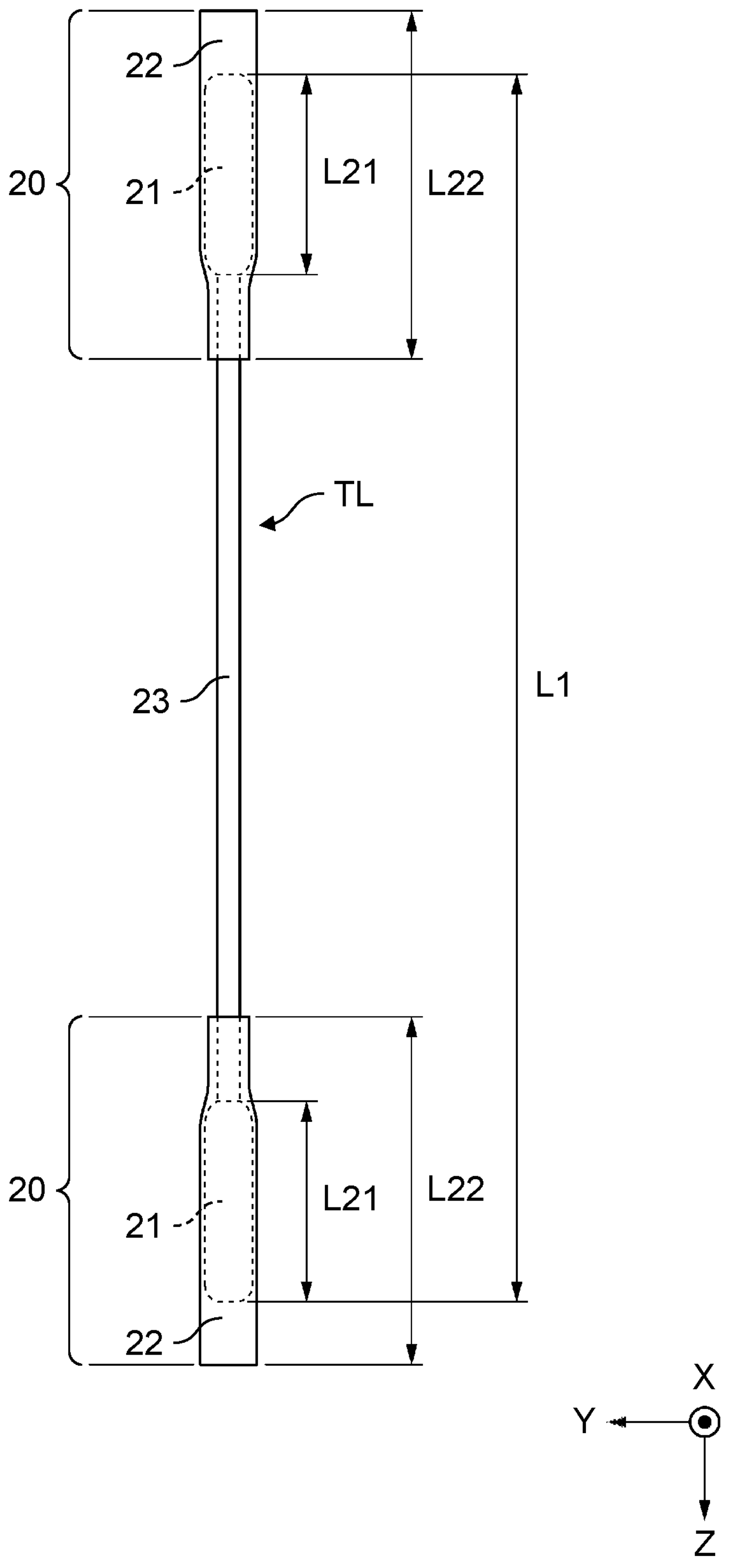
FIG. 5 is a right side view of the extraction tool.
Figure 6:
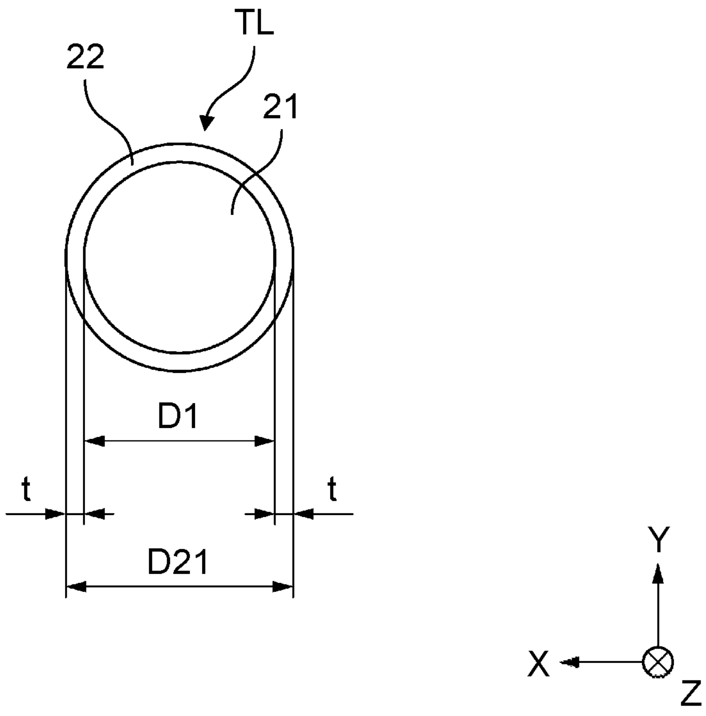
FIG. 6 is a back view of the extraction tool.
Figure 7:
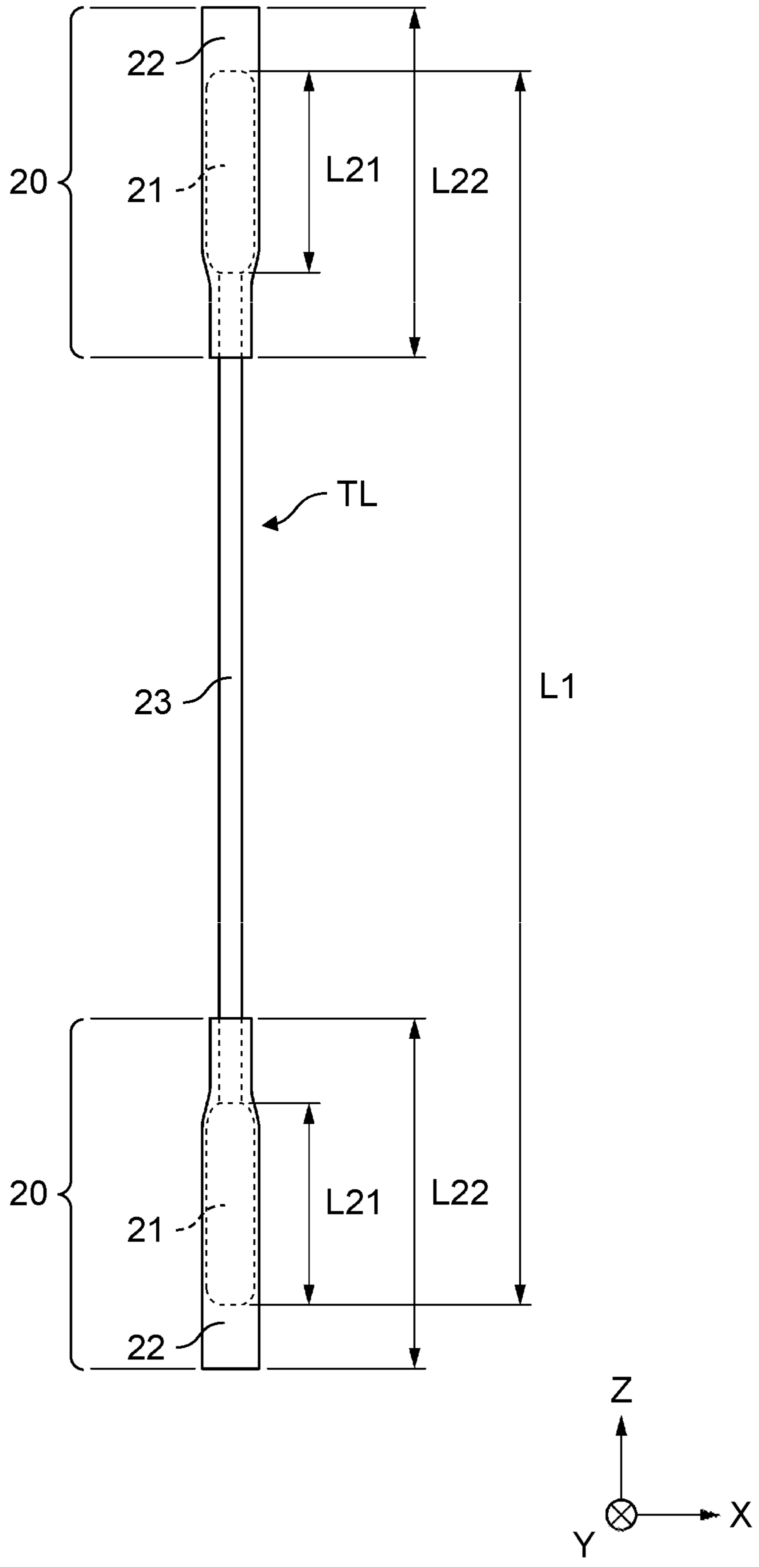
FIG. 7 is a bottom view of the extraction tool.

Next, the outer appearance of extraction tool TL is described with reference to FIGS. 2 to 7. FIG. 2 is a front view of extraction tool TL. FIG. 3 is a top view of extraction tool TL. FIG. 4 is a left side view of extraction tool TL. FIG. 5 is a right side view of extraction tool TL. FIG. 6 is a back view of extraction tool TL. FIG. 7 is a bottom view of extraction tool TL.

Extraction tool TL includes the pair of adhesive parts 20 and connecting part 23 (which is an example of a grip). Each of the pair of adhesive parts 20 includes first member 21 and second member 22. Connecting part 23 is formed integrally with first member 21 provided at one end of connecting part 23 and first member 21 provided at the other end of connecting part 23, and connects these first members 21. Connecting part 23 is gripped by the user when phone plug PG is extracted.

In extraction tool TL, a length (that is, the total length in the direction along the Z-direction) from one first member 21 to other first member 21 is length L1.

First member 21 is made of a plastic material such as rubber, a fiber material such as cotton, or the like. First member 21 is connected to connecting part 23 and covered by second member 22. First member 21 has, for example, outer diameter D1 of 3.5 mm. In addition, first member 21 has a length L21 in the direction along the Z-direction.

Specifically, outer diameter D1 of first member 21 may be more than or equal to inner diameter D22 and less than or equal to outer diameter D21 of second member 22.

Second member 22 is made of a plastic material such as polypropylene, and covers first member 21. Second member 22 allows the inner surface of second member 22 to slide along the surface of cylinder part 21C (see FIG. 9 for an example of a non-adhesive layer or a non-contact part) of first member 21, and allows switching between a projecting state (see FIG. 10) in which first member 21 projects from second member 22 by sliding and a housed state (see FIG. 10) in which first member 21 is housed in second member 22.

Second member 22 has a length L22 (that is, the total length along the Z-direction) from one end to the other end set to around 20 mm. In second member 22, in the direction orthogonal to the Z-direction, for example, one end from which first member 21 can project has outer diameter D21 of 3.5 mm to 3.6 mm, the other end (retaining part 22A, see FIG. 8) that realizes a function as a retainer of first member 21 has inner diameter D22 of 2.1 mm (see FIG. 10), and thickness t is 0.1 mm to 0.2 mm.

Note that the various dimensions of extraction tool TL described above are merely examples, and are not limited thereto. It is needless to say that various dimensions of extraction tool TL may be changed on the basis of values such as inner diameter D3 (see FIG. 12) and depth length L3 (an example of length in the depth direction, see FIG. 17) of audio jack 12, and diameters W1 and W2 of phone plug PG (see FIGS. 13 and 16) to be described later.

Specifically, length L22 of second member 22 only needs to be able to house the entire length of first member 21 in the housed state to be described later (L22>L21) and be longer than depth length L3 of audio jack 12 (L22>L3). Outer diameter D21 of second member 22 may be less than or equal to inner diameter D3 of audio jack 12 (D21≤D3). Further, inner diameter D22 of second member 22 may be less than or equal to outer diameter D1 of first member 21 (D22≤D1).

Although an example in which first member 21 and second member 22 slide while being in contact with each other is described in extraction tool TL in the present exemplary embodiment, a gap may be provided between first member 21 and second member 22.

Figure 8:
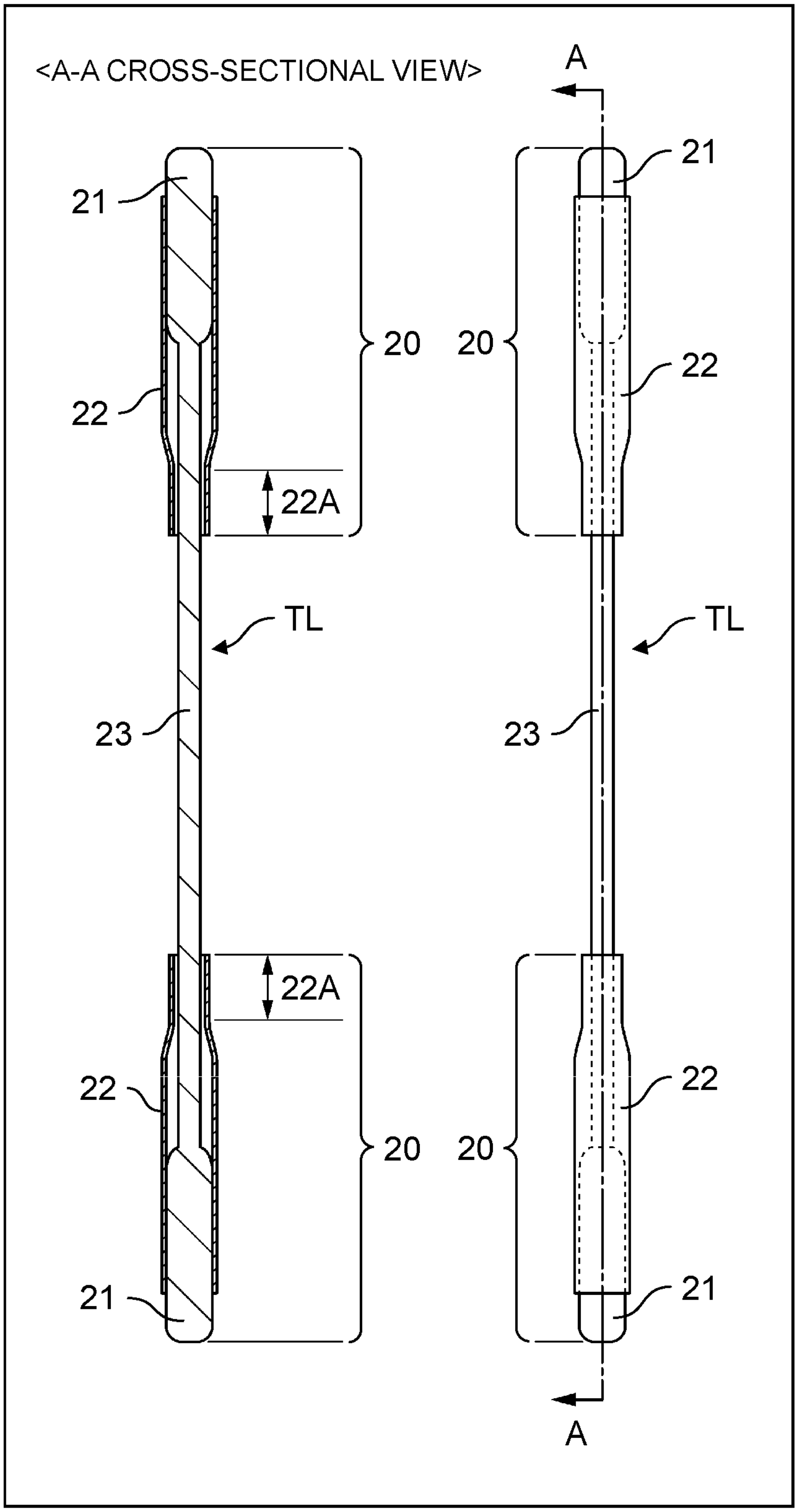
FIG. 8 is an A-A cross-sectional view of the extraction tool.

A cross section of extraction tool TL is described with reference to FIG. 8. FIG. 8 is an A-A cross-sectional view of extraction tool TL. Extraction tool TL shown in FIG. 8 shows an example in which first member 21 is in the projecting state from second member 22.

Second member 22 includes retaining part 22A at the other end opposite to one end from which first member 21 projects. The inner diameter of retaining part 22A has a diameter smaller than outer diameter D1 of first member 21, and prevents first member 21 from being caught and second member 22 from coming off.

Figure 9:
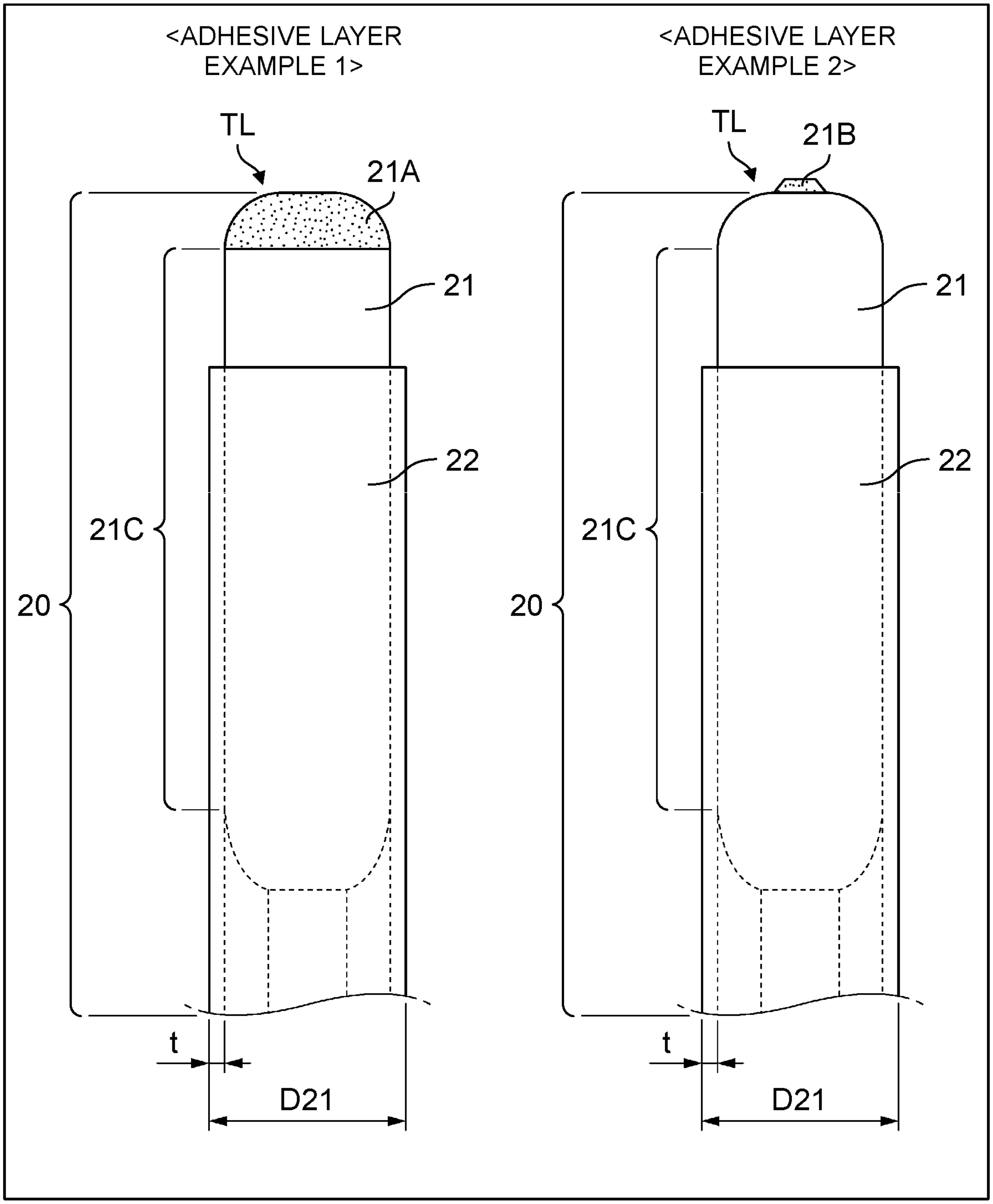
FIG. 9 is a view for explaining an example of an adhesive layer.

The adhesive layer of extraction tool TL is described with reference to FIG. 9. FIG. 9 is a view for explaining an example of adhesive layers 21A and 21B.

First member 21 includes adhesive layer 21A or 21B at the tip projecting from second member 22 and inserted into audio jack 12. That is, first member 21 includes cylinder part 21C and a contact layer (adhesive layer 21A or 21B). Adhesive layer 21A or 21B is provided at the end of cylinder part 21C.

Adhesive layer 21A shown in FIG. 9 is formed by applying an adhesive that adheres to phone plug PG to a non-cylindrical surface (that is, a surface that is not the cylinder part 21C) on one end side of first member 21. Further, adhesive layer 21B is formed by applying an adhesive to the tip on one end side of first member 21. That is, the adhesive layer (adhesive layer 21A or 21B) contains the adhesive.

Note that the timing of forming adhesive layer 21A or 21B may be before phone plug PG is extracted from audio jack 12, or may be at the time of manufacturing or assembling extraction tool TL.

Extraction tool TL may be assembled at any timing such as during use, and the user may attach second member 22 to first member 21 and form (that is, coat) adhesive layer 21A or 21B. Alternatively, in extraction tool TL, only the formation (that is, coating) of adhesive layer 21A or 21B may be performed by the user.

Cylinder part 21C has a substantially cylindrical shape, and slides on second member 22 to achieve switching between the projecting state and the housed state of first member 21. Cylinder part 21C is a non-adhesive layer in which adhesive layer 21A or 21B is not disposed. That is, cylinder part 21C is provided at the end of connecting part 23 (see FIG. 8), and is configured not to be in contact with phone plug PG (see FIG. 12). In addition, the contact layer (adhesive layer 21A or 21B) is provided in cylinder part 21C and is configured to be in contact with phone plug PG. Cylinder part 21C is provided between the end of connecting part 23 and the contact layer (adhesive layer 21A or 21B).

As a result, extraction tool TL can prevent the adhesive of adhesive layer 21A or 21B from adhering to the inner surface of second member 22, and can prevent the adhesive of adhesive layer 21A or 21B from adhering to inner surface 12A of audio jack 12.

Figure 10:
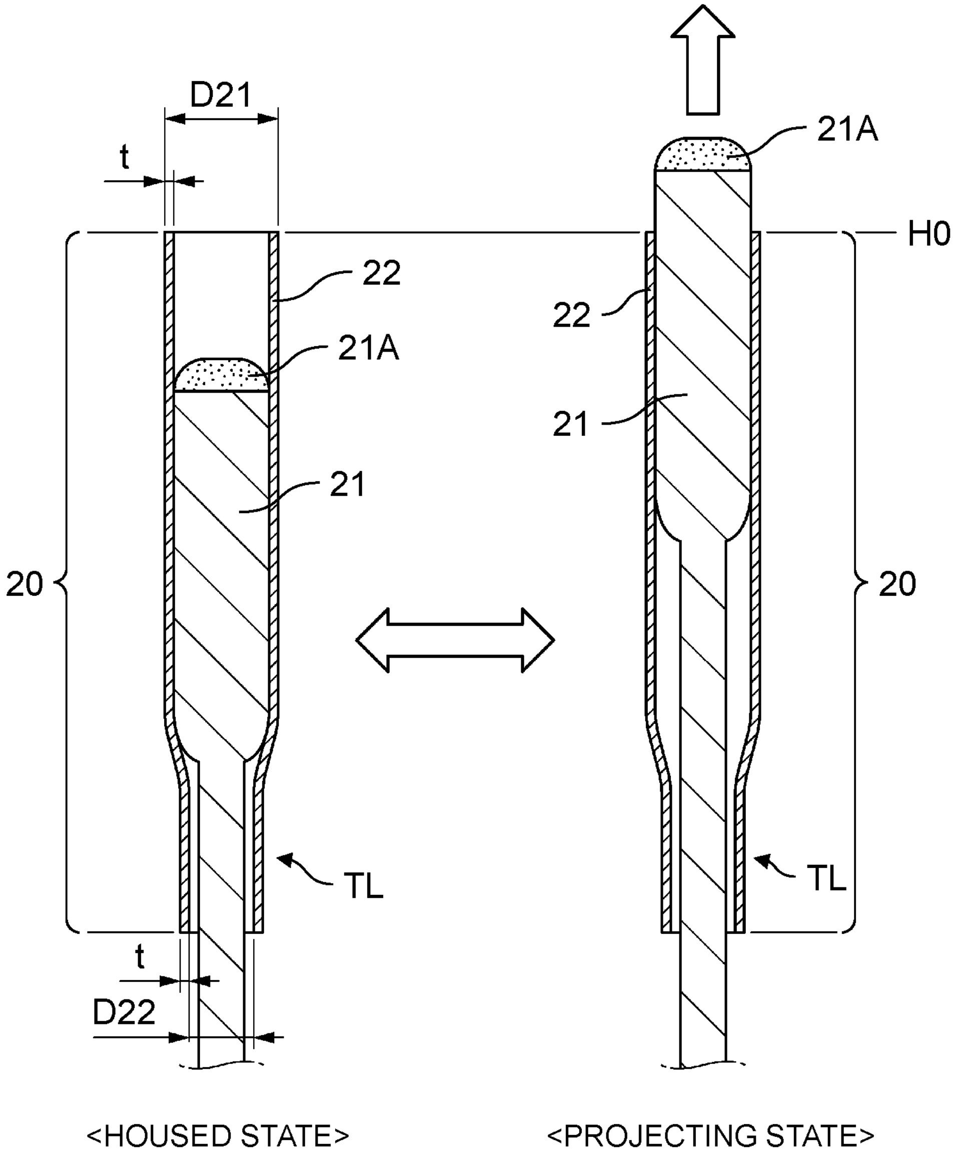
FIG. 10 is a view for explaining an example of a state change of the first member and the second member.

Next, each of the housed state and the projecting state of first member 21 is described with reference to FIG. 10. FIG. 10 is a view for explaining an example of a state change of first member 21 and second member 22. Note that the view of extraction tool TL shown in FIG. 10 is a cross-sectional view taken along cross section A-A of extraction tool TL as in FIG. 8.

Extraction tool TL is switched between the housed state and the projecting state by the operation of the user.

In extraction tool TL in the housed state, adhesive layer 21A of first member 21 is housed in a non-contact state with the inner surface of second member 22. Note that, although not illustrated in FIG. 10, in a case where adhesive layer 21B is provided on first member 21 in extraction tool TL, adhesive layer 21B of first member 21 is housed in a non-contact state with the inner surface of second member 22 similarly to the above.

In extraction tool TL in the projecting state, adhesive layer 21A of first member 21 is projected from second member 22 and to be in a state of being exposed. Note that, although not illustrated in FIG. 10, in a case where adhesive layer 21B is provided on first member 21 in extraction tool TL, adhesive layer 21B of first member 21 is projected from second member 22 similarly to the above to be in a state of being exposed.

Figure 11:
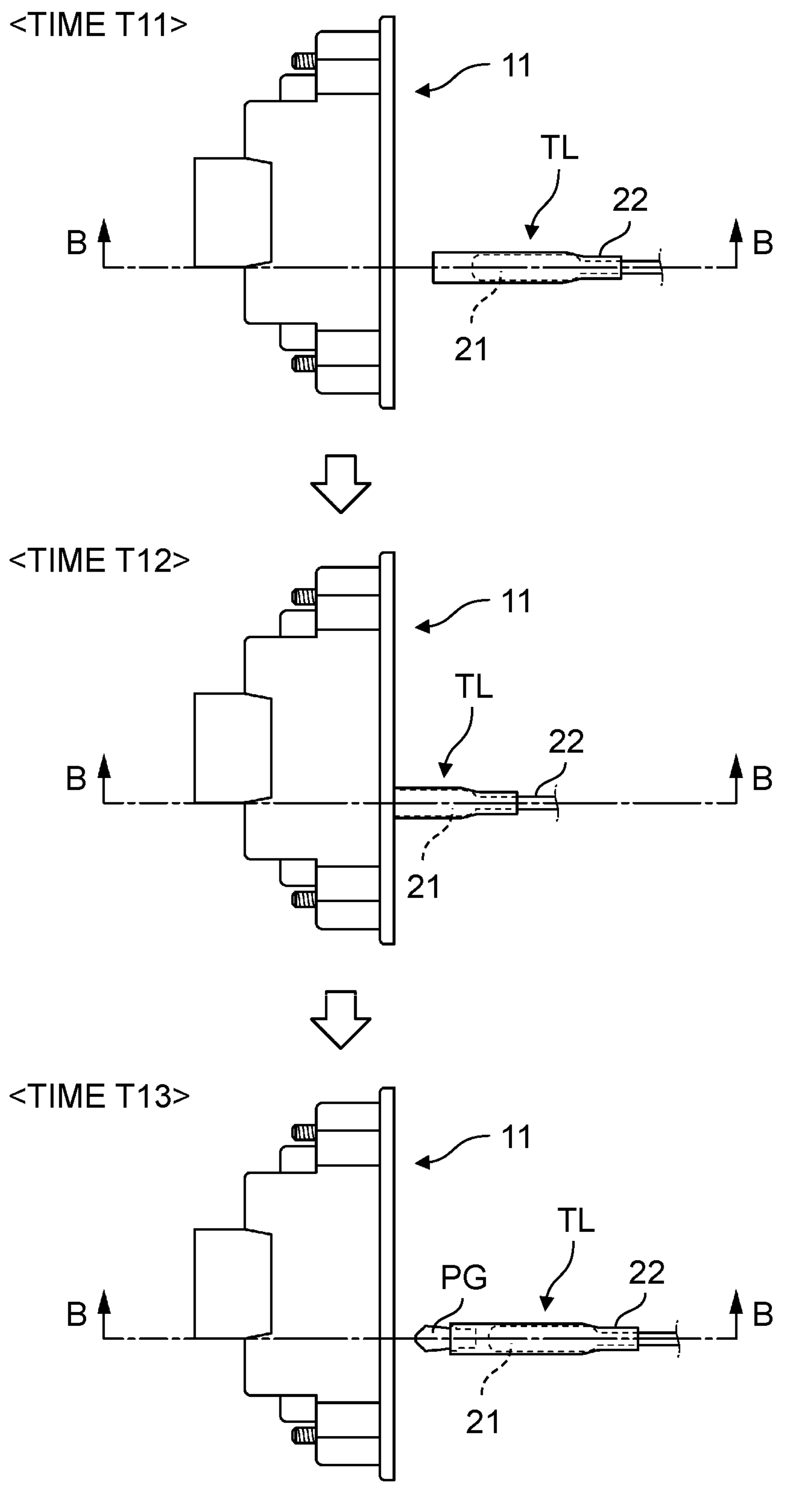
FIG. 11 is a view for explaining a first usage example of the extraction tool.
Figure 12:
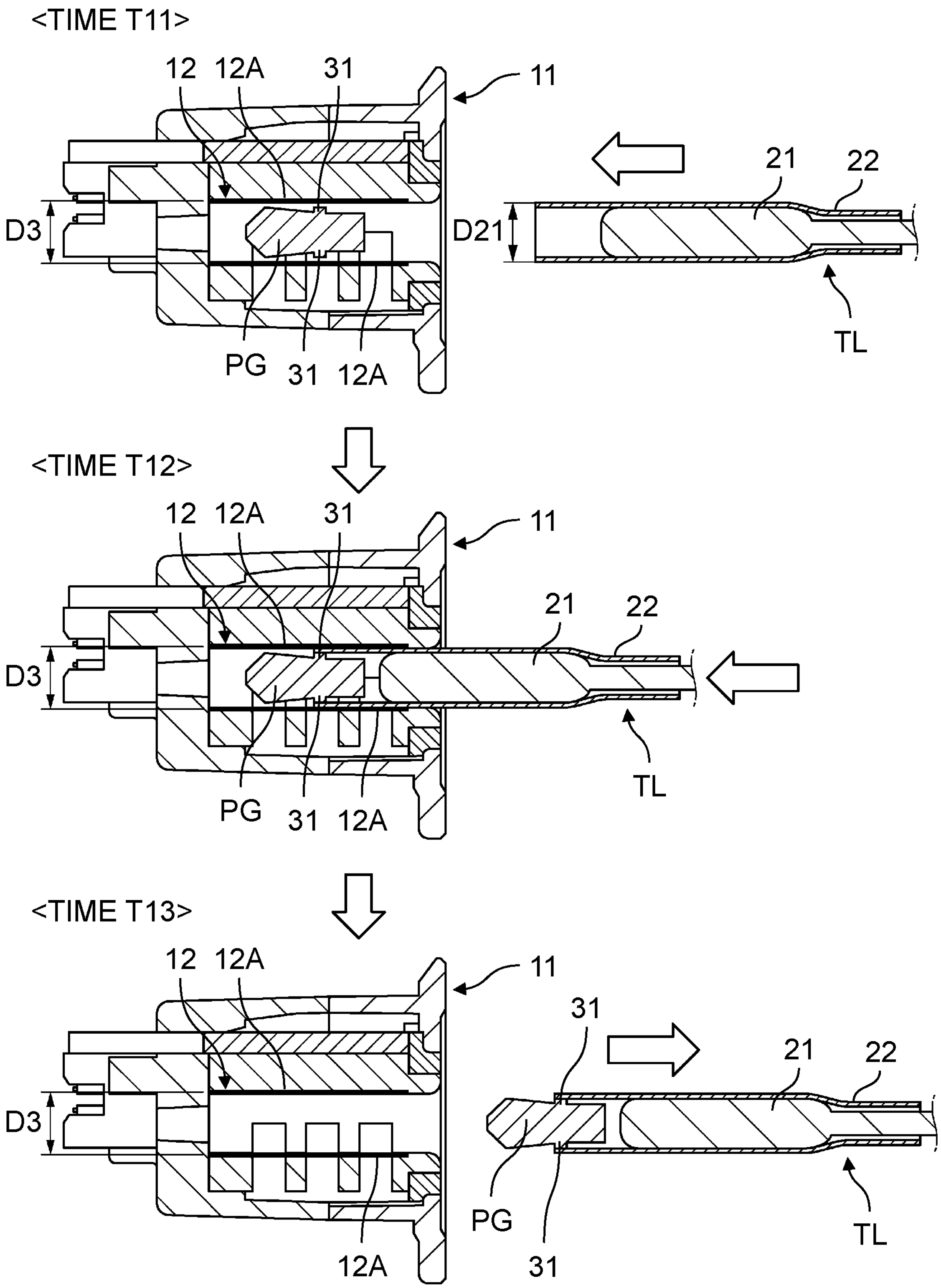
FIG. 12 is a view for explaining an example of a procedure for extracting a phone plug in the first usage example.
Figure 13:
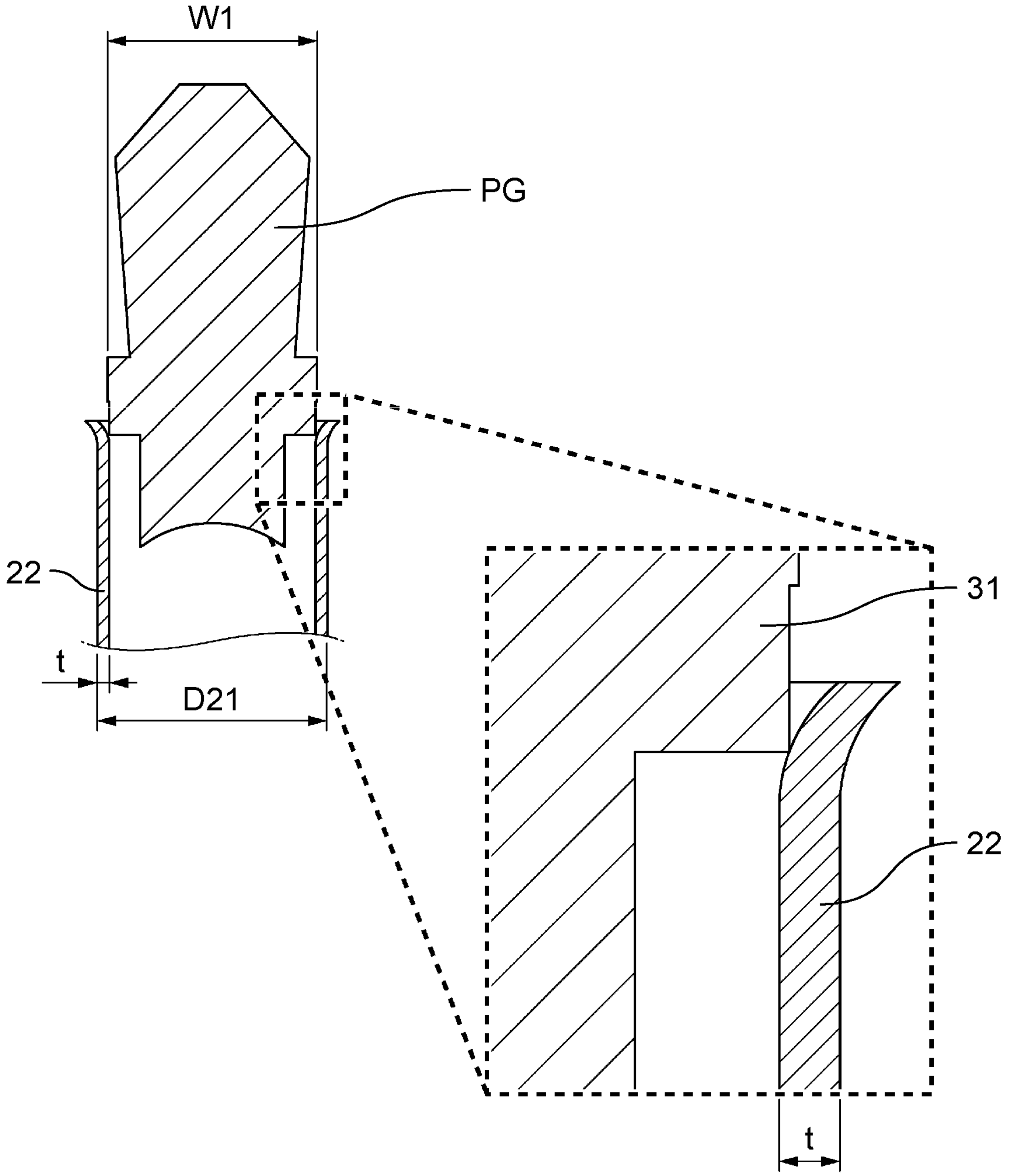
FIG. 13 is a view for explaining a state of the second member at the time of extracting the phone plug in the first usage example.

Next, a first usage example of extraction tool TL according to the present exemplary embodiment is described with reference to each of FIGS. 11 to 13. FIG. 11 is a view for explaining the first usage example of extraction tool TL. FIG. 12 is a view for explaining an example of a procedure for extracting phone plug PG in the first usage example. FIG. 13 is a view for explaining a state of second member 22 at the time of extracting phone plug PG in the first usage example.

Note that, in FIGS. 11 and 12, only a part of audio connection part 11 and extraction tool TL is illustrated and illustration of other configurations is omitted for easy understanding of the description. Further, a part of audio connection part 11 and extraction tool TL shown in FIG. 12 is a B-B cross-sectional view of audio connection part 11 and extraction tool TL shown in FIG. 11.

Hereinafter, as the first usage example of extraction tool TL, a usage example in a case where phone plug PG remaining broken in audio jack 12 is extracted using second member 22 of extraction tool TL is described. In the present exemplary embodiment, the first usage example in which audio jack 12 has inner diameter D3 of 3.6 mm to 3.7 mm is described, but it is needless to say that inner diameter D3 of audio jack 12 is not limited thereto.

Extraction tool TL at time T11 is in a state before being inserted into audio jack 12 of audio connection part 11. In extraction tool TL, adhesive part 20 is in the housed state and first member 21 is housed in second member 22. In addition, phone plug PG remains broken in audio jack 12.

Extraction tool TL at time T12 is inserted into audio jack 12 of audio connection part 11 by the user. In extraction tool TL, second member 22 enters between protrusion 31 of phone plug PG and inner surface 12A of audio jack 12, and retains phone plug PG remaining broken in audio jack 12.

Specifically, in extraction tool TL, second member 22 made of an elastic plastic material is further pushed into the depth of audio jack 12 by the user in a state of being in contact with phone plug PG, which causes second member 22 to be deformed along the outer shape (for example, the protrusion 31) of phone plug PG (see FIG. 13). By having second member 22 deformed, extraction tool TL can enter between protrusion 31 of phone plug PG and inner surface 12A of audio jack 12. As a result, extraction tool TL releases the physical contact state and the caught state between audio jack 12 and phone plug PG.

For example, in a case where the inner diameter (=outer diameter D21−2×thickness t) of second member 22 of extraction tool TL is smaller than diameter W1 (width) of phone plug PG (see FIG. 13), extraction tool TL retains protrusion 31 of phone plug PG by the force with which second member 22 extended to diameter W1 of phone plug PG returns to the original inner diameter when entering between protrusion 31 of phone plug PG and inner surface 12A of audio jack 12.

Extraction tool TL at time T13 is extracted from audio jack 12 by the user in a state where second member 22 retains protrusion 31 of phone plug PG to extract broken phone plug PG from audio jack 12.

As a result, extraction tool TL according to the present exemplary embodiment can extract phone plug PG remaining broken in audio jack 12.

In the first usage example shown in FIGS. 11 and 12, an example in which protrusion 31 of phone plug PG is retained by second member 22 has been described, but the present invention is not limited thereto.

For example, in extraction tool TL, second member 22 enters between phone plug PG and inner surface 12A of audio jack 12 to release the physical contact state and the caught state between phone plug PG and audio jack 12. Extraction tool TL may extract phone plug PG released from the caught state from audio jack 12 by adhering phone plug PG to adhesive layer 21A or 21B of first member 21.

Figure 14:
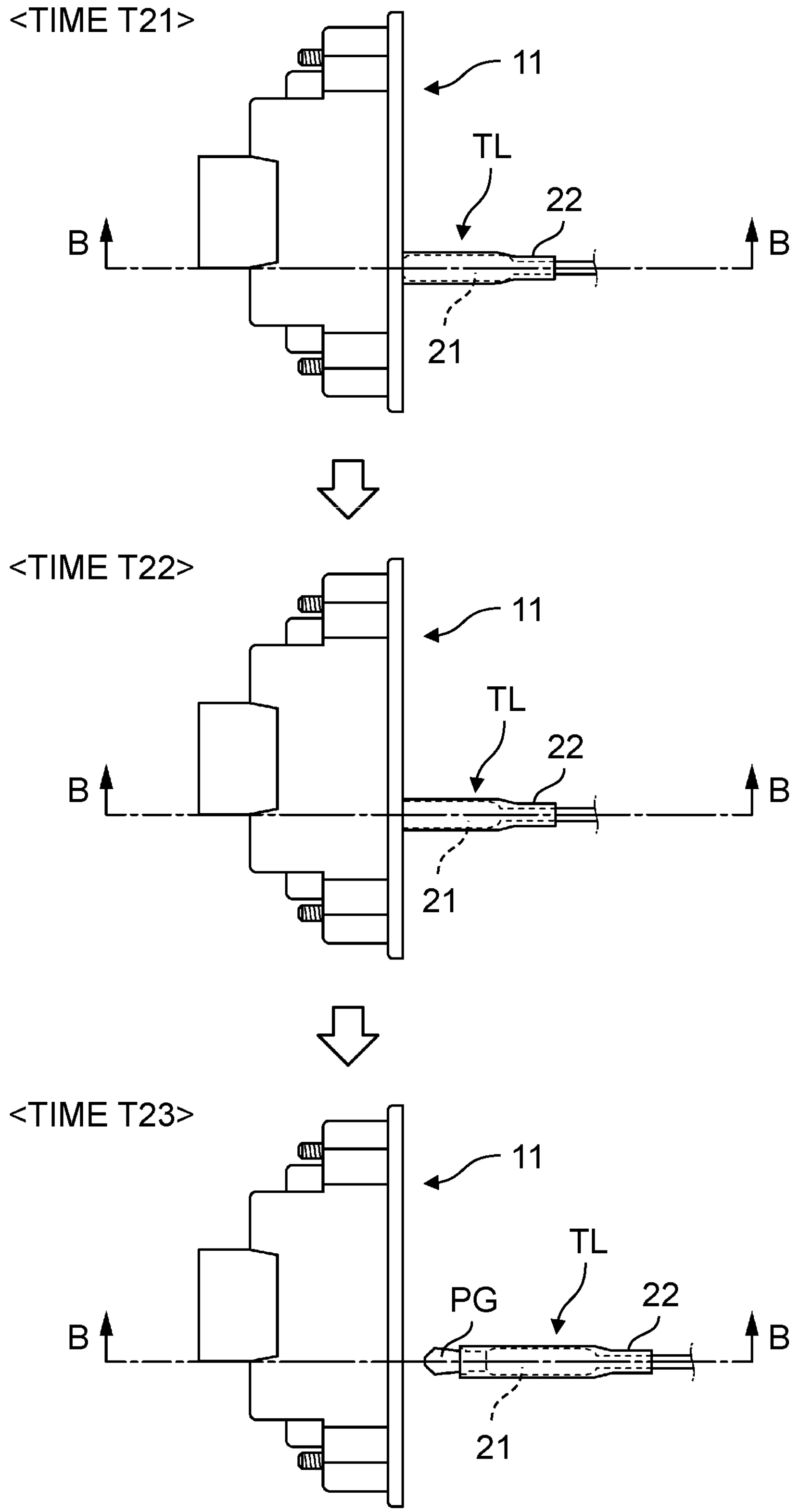
FIG. 14 is a view for explaining a second usage example of the extraction tool.
Figure 15:
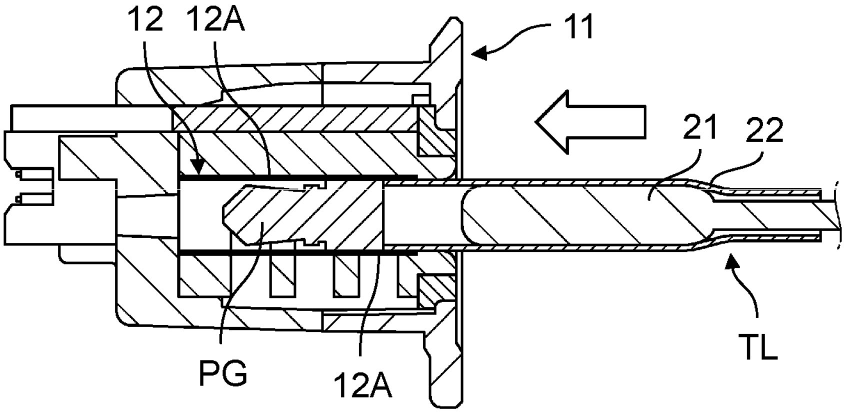
FIG. 15 is a view for explaining an example of a procedure for extracting the phone plug in the second usage example.
Figure 15:
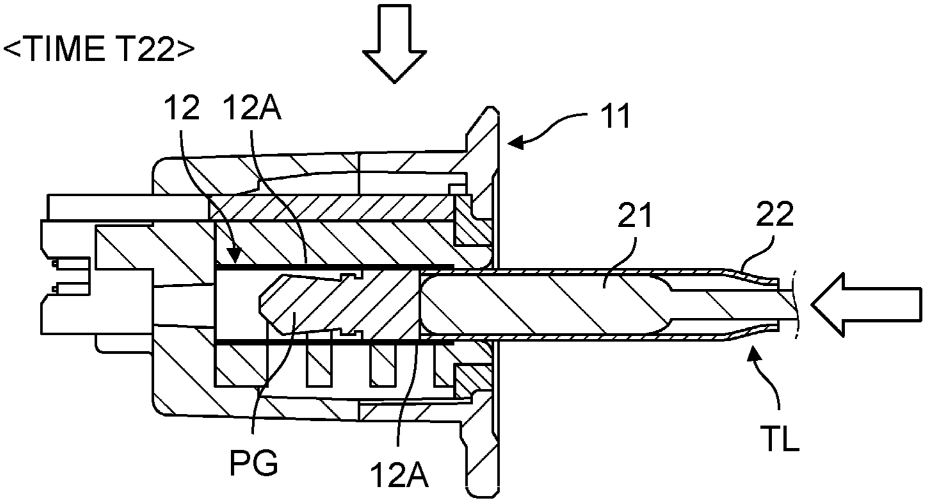
Figure 15:
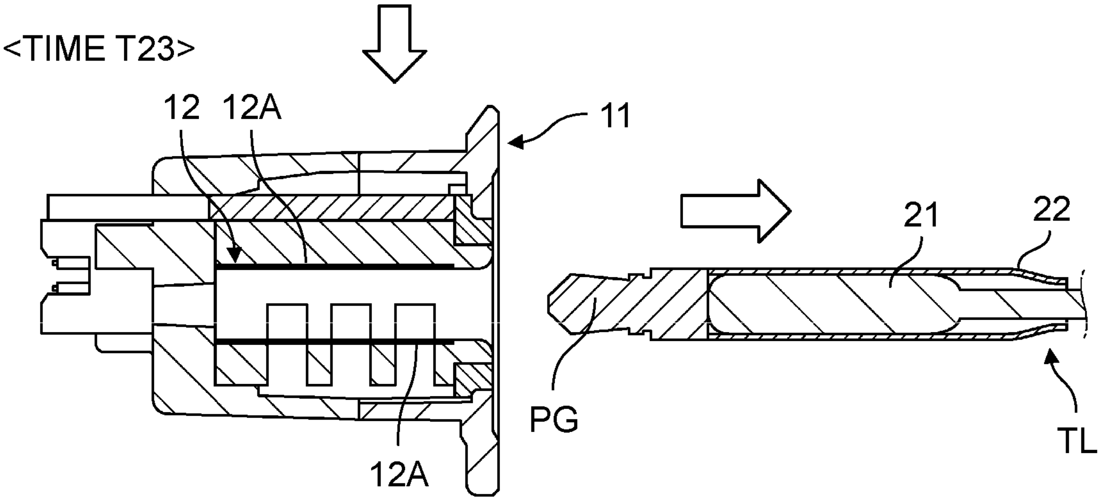
Figure 16:
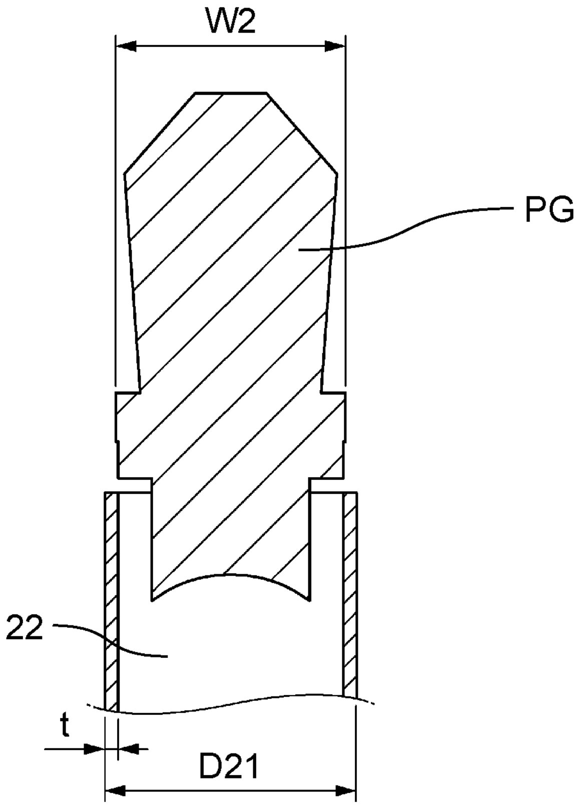
FIG. 16 is a view for explaining the relationship between the diameter of the phone plug and the inner diameter of a second member.
Figure 17:
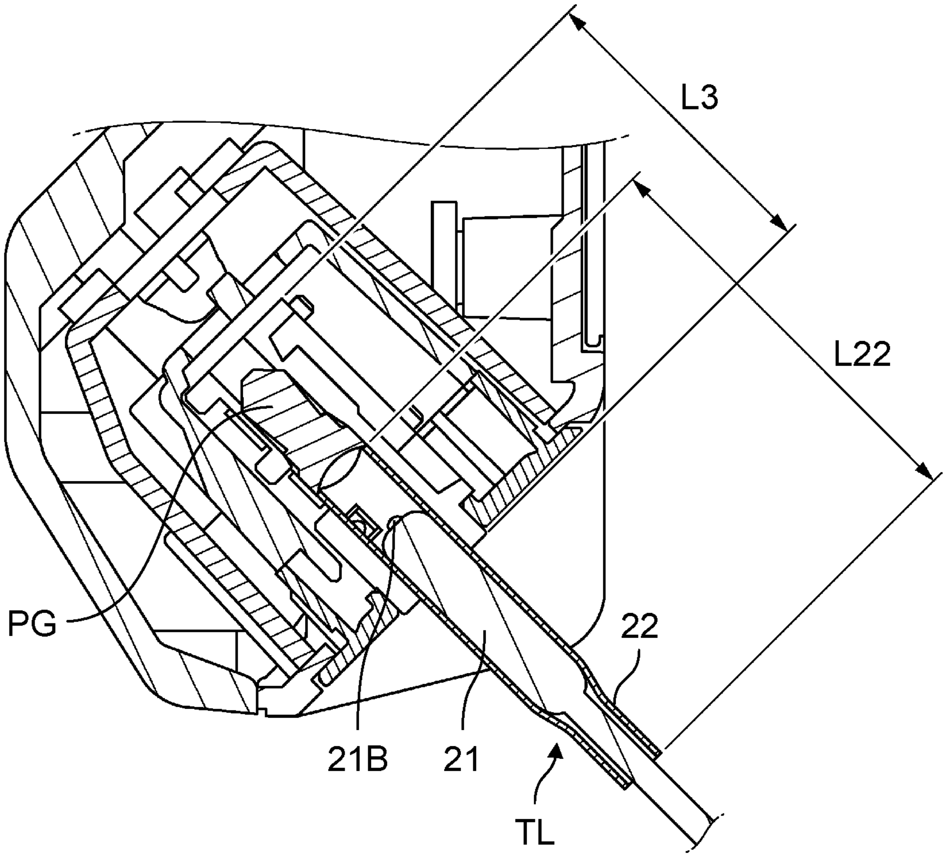
FIG. 17 is a view for explaining the relationship between the length of an audio jack and the length of the second member.
Figure 18:
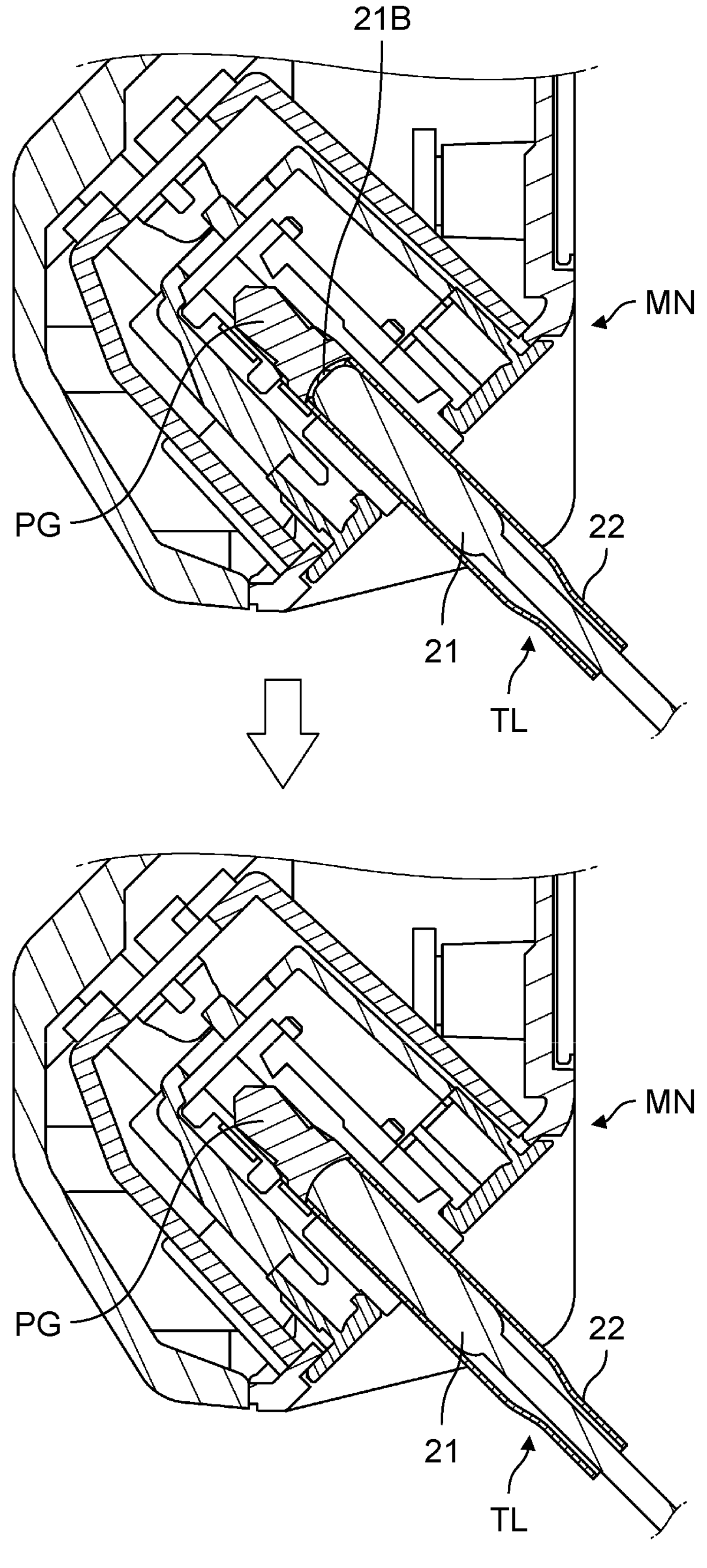
FIG. 18 is a view for explaining a state of the first member at the time of performing adhesion in the second usage example.
Figure 19:
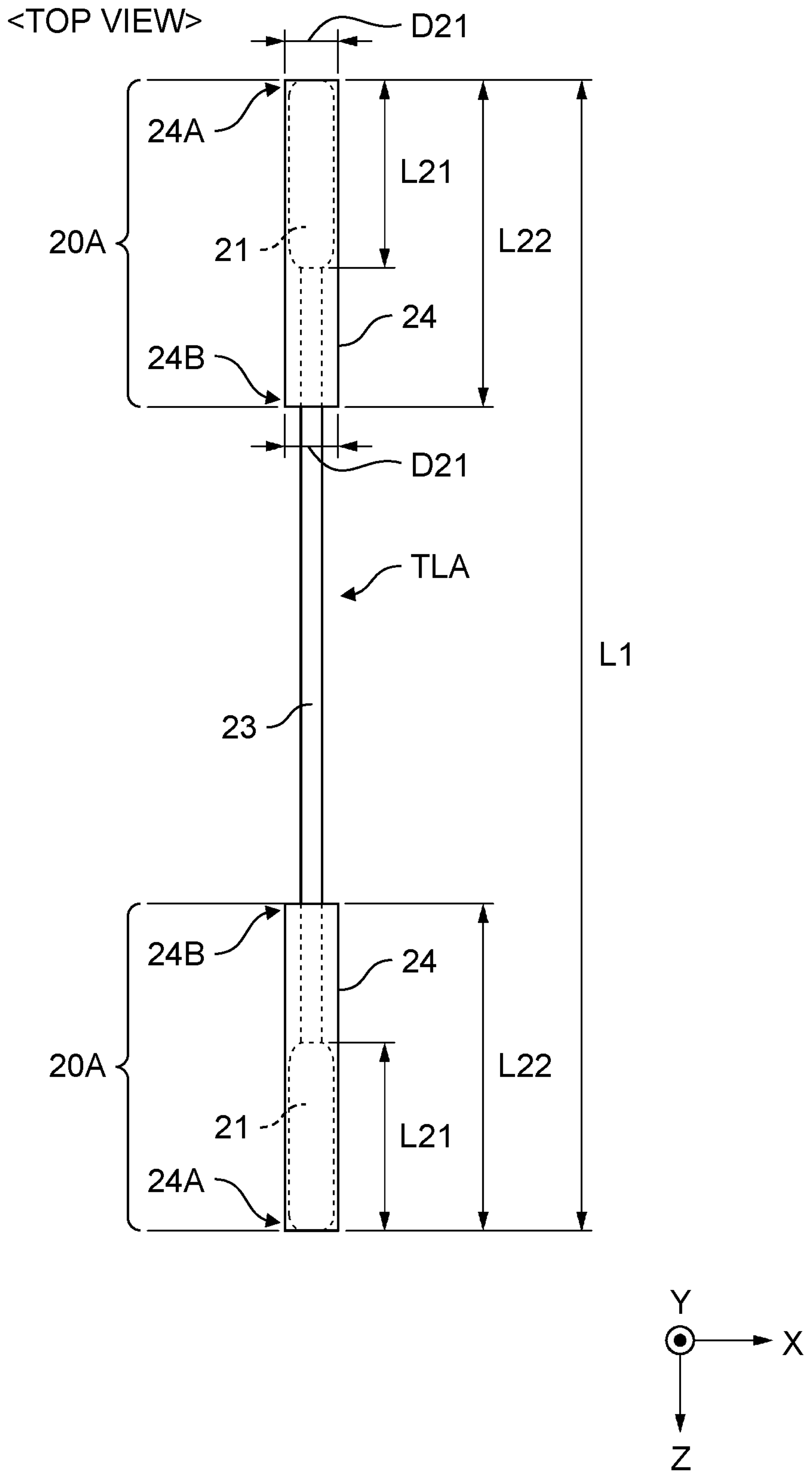
FIG. 19 is a view showing an example of the extraction tool according to a modification of the exemplary embodiment.

Next, a second usage example of extraction tool TL according to the present exemplary embodiment is described with reference to each of FIGS. 14 to 18. FIG. 14 is a view for explaining the second usage example of extraction tool TL. FIG. 15 is a view for explaining an example of a procedure for extracting phone plug PG in the second usage example. FIG. 16 is a view for explaining the relationship between diameter W2 (an example of width and outer diameter) of phone plug PG and the inner diameter of second member 22. FIG. 17 is a view for explaining the relationship between length L1 of the audio jack and length L22 of second member 22. FIG. 18 is a view for explaining a state of first member 21 at the time of performing adhesion in the second usage example.

Note that, in FIGS. 14 and 15, only a part of audio connection part 11 and extraction tool TL is illustrated and illustration of other configurations is omitted for easy understanding of the description. Further, a part of audio connection part 11 and extraction tool TL shown in FIG. 15 is a B-B cross-sectional view of audio connection part 11 and extraction tool TL shown in FIG. 14.

Hereinafter, as the second usage example of extraction tool TL, a usage example in a case where phone plug PG remaining broken in audio jack 12 is extracted using first member 21 of extraction tool TL is described. In the present exemplary embodiment, the second usage example in which audio jack 12 has depth L3 of 15 mm is described, but it is needless to say that depth L3 of audio jack 12 is not limited thereto.

Extraction tool TL at time T21 shows a state in which extraction tool TL is inserted into audio jack 12 of audio connection part 11 and second member 22 and phone plug PG remaining broken in audio jack 12 are in contact with each other. At this time, in extraction tool TL, adhesive part 20 is in the housed state and first member 21 is housed in second member 22.

From the state in which second member 22 and phone plug PG remaining broken in audio jack 12 are in contact with each other, extraction tool TL at time T22 is further pushed toward the depth of audio jack 12 by the operation of the user to be in the projecting state in which first member 21 protrudes from second member 22.

Specifically, the user pushes extraction tool TL toward the depth of audio jack 12 while holding connecting part 23. In extraction tool TL, first member 21 slides on the inner surface of second member 22 toward the depth of audio jack 12 to be in the projecting state shown at time T22, and adhesive layer 21B of projected first member 21 comes into contact with phone plug PG. In this case, the inner diameter (=outer diameter D21−2×thickness t) of second member 22 of extraction tool TL is larger than diameter W2 of phone plug PG (see FIG. 14).

Depth length L3 of audio jack 12 is smaller than length L22 of second member 22 (L22>L3, see FIG. 17). As a result, even when phone plug PG remains broken at the deepest part of audio jack 12, extraction tool TL allows the adhesive of adhesive layer 21B to be protected by second member 22 from adhering to inner surface 12A of audio jack 12.

In addition, because first member 21 is made of a plastic material such as rubber, a fiber material such as cotton, or the like, first member 21 can be deformed. As a result, regardless of the shape of broken phone plug PG, by first member 21 being pushed toward the depth side (that is, the position of phone plug PG) of audio jack 12 by the operation of the user, extraction tool TL can have adhesive layer 21B of first member 21 deformed along the shape of broken phone plug PG and firmly adhered to phone plug PG.

Extraction tool TL at time T23 is extracted from audio jack 12 by the user in a state where adhesive layer 21B of first member 21 is adhered to and retains phone plug PG to extract broken phone plug PG from audio jack 12.

As a result, extraction tool TL according to the present exemplary embodiment can extract phone plug PG remaining broken in audio jack 12.

In the second usage example shown in FIGS. 14 and 15, an example of extracting phone plug PG using first member 21 having adhesive layer 21B has been described, but the same applies to first member 21 having adhesive layer 21A.

Modification of Exemplary Embodiment

Extraction tool TL according to the exemplary embodiment has been exemplified to have the configuration in which retaining part 22A is disposed in second member 22 to prevent second member 22 from coming off from the tip side (side on which adhesive layer 21A or 21B is formed) of first member 21 when first member 21 slides. An example in which extraction tool TLA according to the modification of the exemplary embodiment has a structure of not having retaining part 22A in second member 22 is described.

Note that in the following description, the same reference numerals are given to the same configurations as those of the parts constituting extraction tool TL according to the first exemplary embodiment, and the description thereof is omitted.

Extraction tool TLA according to the modification of the exemplary embodiment includes a pair of adhesive parts 20A and connecting part 23 (which is an example of a grip). Each of the pair of adhesive parts 20A includes first member 21 and second member 24.

First member 21 is connected to connecting part 23 and covered by second member 24.

Second member 24 is made of a plastic material such as polypropylene, and covers first member 21. Second member 24 may consist of polypropylene. Second member 24 allows the inner surface of second member 24 to slide along the surface of cylinder part 21C (see FIG. 9 for an example of a non-adhesive layer) of first member 21, and allows switching between the projecting state (see FIG. 10) in which first member 21 projects from second member 24 by sliding and the housed state (see FIG. 10) in which first member 21 is housed in second member 24.

In second member 24, for example, one end 24A from which first member 21 can project has the same diameter as other end 24B disposed on the side where first member 21 is connected to connecting part 23, and outer diameter D21 is set to 3.5 mm to 3.6 mm and thickness t is set to 0.1 mm to 0.2 mm. Note that the various dimensions of extraction tool TLA described above are merely examples, and are not limited thereto.

As described above, each of extraction tools TL and TLA according to the exemplary embodiment is the extraction tool that can extract phone plug PG (an example of an object) inside audio jack 12 (an example of a hole), and includes: connecting part 23 (an example of grip); first member 21 including adhesive layer 21A or 21B (an example of an adhesive layer) provided at the end of connecting part 23 and being able to come into contact with phone plug PG, and cylinder part 21C (an example of a non-contact layer) not being able to come into contact with phone plug PG; and second member 22 or 24 surrounding at least a part of first member 21. Cylinder part 21C of first member 21 can slide on second member 22 or 24.

As a result, in each of extraction tools TL and TLA according to the exemplary embodiment, adhesive layer 21A or 21B of first member 21 to which the adhesive is applied during use or manufacture can slide without adhering to the inner surface of second member 22 or 24, and phone plug PG remaining broken in audio jack 12 can be easily extracted by adhesive layer 21A or 21B.

Further, adhesive layer 21A or 21B in each of extraction tools TL and TLA according to the exemplary embodiment can be adhered to phone plug PG, and cylinder part 21C cannot be adhered to phone plug PG. That is, cylinder part 21C does not contain an adhesive. As a result, in each of extraction tools TL and TLA according to the exemplary embodiment, adhesive layer 21A or 21B of first member 21 in a state where the adhesive is applied can slide without adhering to the inner surface of second member 22 or 24.

In addition, adhesive layer 21A or 21B in each of extraction tools TL and TLA according to the exemplary embodiment is formed by applying an adhesive. As a result, in each of extraction tools TL and TLA according to the exemplary embodiment, adhesive layer 21A or 21B may be formed at the timing desired by the user, which can suppress a decrease in adhesive performance due to drying of the adhesive applied to adhesive layer 21A or 21B.

Further, outer diameter D21 of second member 22 or 24 in each of extraction tools TL and TLA according to the exemplary embodiment is less than or equal to inner diameter D3 of audio jack 12. Thus, each of extraction tools TL and TLA according to the exemplary embodiment can easily have adhesive part 20 or 20A inserted into audio jack 12.

In addition, inner diameter (=outer diameter D21−2× thickness t) of second member 22 or 24 in each of extraction tools TL and TLA according to the exemplary embodiment is larger than diameter W2 (an example of the outer diameter) of phone plug PG. As a result, in each of extraction tools TL and TLA according to the exemplary embodiment, after phone plug PG is inserted in second member 22 or 24, adhesive layer 21A or 21B of first member 21 can be adhered to phone plug PG without adhesive layer 21A or 21B coming into contact with inner surface 12A of audio jack 12. Therefore, each of extraction tools TL and TLA can prevent the adhesive from adhering to inner surface 12A in audio jack 12 at the time of extracting phone plug PG.

In addition, inner diameter (=outer diameter D21−2× thickness t) on one end (a first end) of second member 22 in extraction tool TL according to the exemplary embodiment is more than or equal to outer diameter D1 of first member 21. Inner diameter D22 on the other end (a second end) of second member 22 is smaller than outer diameter D1 of first member 21. As a result, extraction tool TL according to the exemplary embodiment can prevent first member 21 from coming off from the side opposite to the direction in which first member 21 is inserted into audio jack 12.

In addition, length L22 of second member 22 or 24 in each of extraction tools TL and TLA according to the exemplary embodiment is longer than depth length L3 (an example of the length in the depth direction) of audio jack 12 (L22>L3). As a result, in each of extraction tools TL and TLA according to the exemplary embodiment, even when phone plug PG remains broken at the deepest part of audio jack 12, phone plug PG can be adhered to adhesive layer 21A or 21B of first member 21 to be extracted. In addition, because second member 22 or 24 can be inserted to the deepest part of audio jack 12, each of extraction tools TL and TLA can prevent the adhesive from adhering from adhesive layer 21A and 21B to inner surface 12A of audio jack 12.

In addition, in first member 21 of each of extraction tools TL and TLA according to the exemplary embodiment, adhesive layer 21A or 21B can be deformed. As a result, in each of extraction tools TL and TLA according to the exemplary embodiment, the adhesive surface of adhesive layer 21A or 21B in contact with phone plug PG can be deformed according to the shape of broken phone plug PG. Therefore, each of extraction tools TL and TLA can extract phone plug PG more reliably.

In addition, second member 22 or 24 in each of extraction tools TL and TLA according to the exemplary embodiment has elasticity and can be deformed by the external force received from phone plug PG. As a result, each of extraction tools TL and TLA according to the exemplary embodiment can house phone plug PG in the space between second member 22 or 24 and first member 21 housed in second member 22 or 24. In addition, each of extraction tools TL and TLA can be deformed in accordance with the shape of phone plug PG to enter between inner surface 12A of audio jack 12 and phone plug PG, or to retain phone plug PG by second member 22 or 24.

In addition, in each of extraction tools TL and TLA according to the exemplary embodiment, when second member 22 or 24 is inserted into audio jack 12 and second member 22 or 24 is inserted in the depth direction of audio jack 12 in a state of being in contact with phone plug PG, the tip position of second member 22 or 24 in the depth direction coincide with the tip position of first member 21. As a result, each of extraction tools TL and TLA according to the exemplary embodiment can prevent the adhesive of adhesive layer 21A or 21B from adhering to inner surface 12A of audio jack 12, and can have phone plug PG adhered to and extracted by adhesive layer 21A or 21B of first member 21 whose position coincides with the tip position of second member 22 or 24.

In addition, in each of extraction tools TL and TLA according to the exemplary embodiment, when second member 22 or 24 is inserted into audio jack 12 and second member 22 or 24 is inserted in the depth direction of audio jack 12 in a state of being in contact with phone plug PG, second member 22 or 24 enters between phone plug PG and the inner surface of audio jack 12. As a result, each of extraction tools TL and TLA according to the exemplary embodiment can enter between inner surface 12A of audio jack 12 and phone plug PG, prevent the adhesive of adhesive layer 21A or 21B from adhering to inner surface 12A of audio jack 12, and retain and extract phone plug PG by second member 22 or 24.

In addition, in each of extraction tools TL and TLA according to the exemplary embodiment, first member 21 can be switched between the projecting state that at least a part of adhesive layer 21A or 21B projects from second member 22 or 24 by sliding on second member 22 or 24 and the housed state that adhesive layer 21A or 21B is surrounded by second member 22 or 24. As a result, each of extraction tools TL and TLA according to the exemplary embodiment can be switched between a state (housed state) in which the adhesive of adhesive layer 21A or 21B is not exposed from second member 22 or 24 to prevent the adhesive from adhering to audio connection part 11, audio jack 12, and the like, and a state (projecting state) in which adhesive layer 21A or 21B can adhere to the extraction target such as phone plug PG when first member 21 is in the projecting state.

While various exemplary embodiments have been described above with reference to the drawings, it is obvious that the present disclosure is not limited thereto. It is obvious to those skilled in the art that various modification examples, correction examples, substitution examples, addition examples, deletion examples, and equivalent examples can be conceived within the scope of claims, and thus it is obviously understood that those examples belong to the technical scope of the present disclosure. Additionally, each component in the various exemplary embodiments described above may be appropriately combined without departing from the spirit of the disclosure.

The present disclosure is useful as an extraction tool that easily extracts an object inside a hole.

What is claimed is:

1. An extraction tool configured to extract an object inside a hole, the extraction tool comprising:
- a grip having an end;
- a first member including:
  - a non-contact part provided at the end of the grip and not being able to come into contact with the object, and
  - a contact layer provided at an end of the non-contact part and being able to come into contact with the object; and
- a second member surrounding at least a part of the first member, wherein
- the non-contact part of the first member is slidable with respect to the second member,
- the contact layer is adherable to the object,
- the non-contact part is not adherable to the object, and
- the contact layer contains an adhesive.

2. The extraction tool according to claim 1, wherein the non-contact part is provided between the end of the grip and the contact layer.

3. The extraction tool according to claim 1, wherein the second member has an outer diameter that is less than or equal to an inner diameter of the hole.

4. The extraction tool according to claim 1, wherein the second member has an inner diameter that is larger than an outer diameter of the object.

5. The extraction tool according to claim 1, wherein
- the second member includes a first end and a second end that are opposite to each other,
- the first end of the second member has an inner diameter that is more than or equal to an outer diameter of the first member, and
- the second end of the second member has an inner diameter that is smaller than the outer diameter of the first member.

6. The extraction tool according to claim 1, wherein the second member has a length that is longer than a length of the hole in a depth direction.

7. The extraction tool according to claim 1, wherein the contact layer of the first member is deformable.

8. The extraction tool according to claim 1, wherein the second member has elasticity and is deformable by an external force received from the object.

9. The extraction tool according to claim 8, wherein the second member contains polypropylene.

10. The extraction tool according to claim 1, wherein, when the second member is inserted into the hole and the second member is inserted in a depth direction of the hole in a state of being in contact with the object, the second member has a tip position in the depth direction that coincides with a tip position of the first member.

11. The extraction tool according to claim 1, wherein, when the second member is inserted into the hole and the second member is inserted in a depth direction of the hole in a state of being in contact with the object, the second member enters between the object and an inner surface of the hole.

12. The extraction tool according to claim 1, wherein the first member is switchable between (i) a projecting state that at least a part of the contact layer projects from the second member by sliding on the second member and (ii) a housed state that the contact layer is surrounded by the second member.

* * * * *